Aug. 25, 1959 C. G. SNELL 2,900,659
CASTER LOCKING MECHANISM
Filed March 20, 1957 2 Sheets-Sheet 1

Aug. 25, 1959     C. G. SNELL     2,900,659
CASTER LOCKING MECHANISM
Filed March 20, 1957     2 Sheets-Sheet 2

United States Patent Office 2,900,659
Patented Aug. 25, 1959

2,900,659

CASTER LOCKING MECHANISM

Clarence George Snell, Oriskany Falls, N.Y., assignor to Divine Brothers Company, Utica, N.Y., a corporation of New York Application March 20, 1957, Serial No. 647,294

7 Claims. (Cl. 16—35)

This invention relates to caster locking mechanism especially intended for locking relatively large casters, such as those used on industrial trucks and tubular scaffolding.

An object of the invention is the provision of generally improved and more satisfactory mechanism for locking casters both with respect to rotation about the horizontal axis of the caster wheel and with respect to rotation about the vertical axis of the caster bracket or support.

Another object is the provision of locking mechanism so designed and constructed that relatively great locking force can be applied easily to the caster, and that the caster may be unlocked relatively easily and quickly.

Still another object is the provision of caster locking mechanism so designed and constructed as to lock effectively regardless of whether the caster wheel is comparatively new and of full initial diameter, or whether the wheel is an old one badly worn and of substantially reduced diameter.

These and other desirable objects may be attained in the manner disclosed as an illustrative embodiment of the invention in the following description and in the accompanying drawings forming a part hereof, in which.

Figure 1:
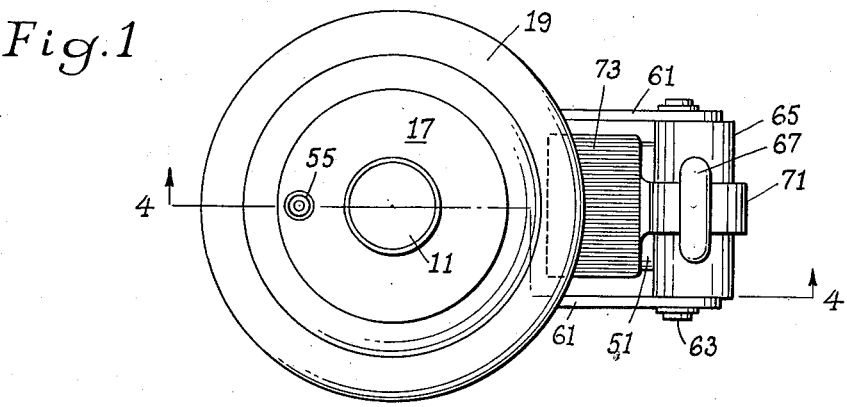
Fig. 1 is a top plan view of a caster equipped with locking mechanism according to a preferred form of the present invention, showing the lock in its unlocked position.
Figure 2:
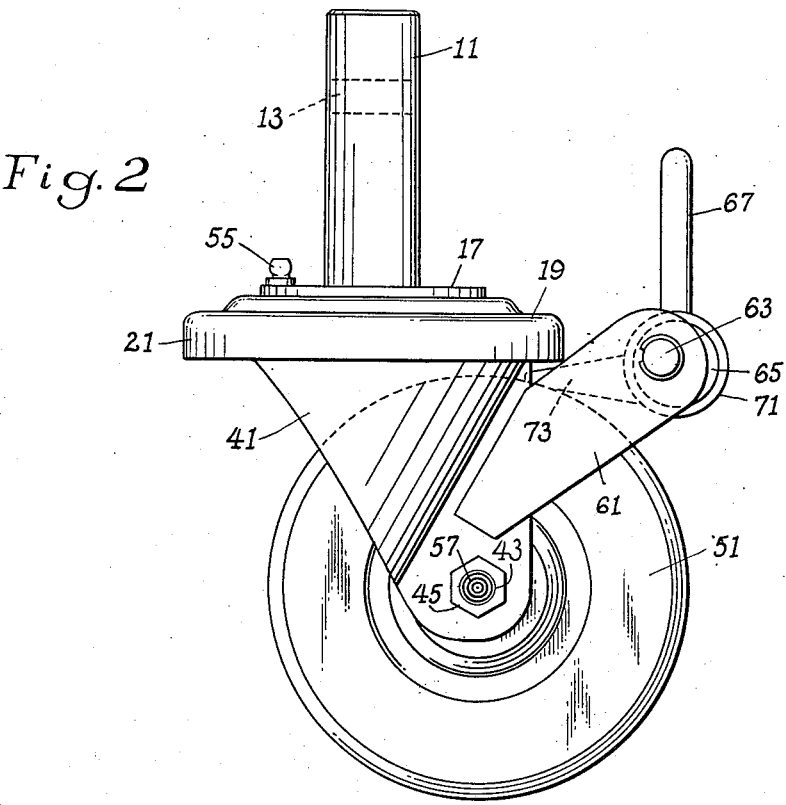
Fig. 2 is a side elevation of the parts shown in Fig. 1, in the same unlocked position.
Figure 4:
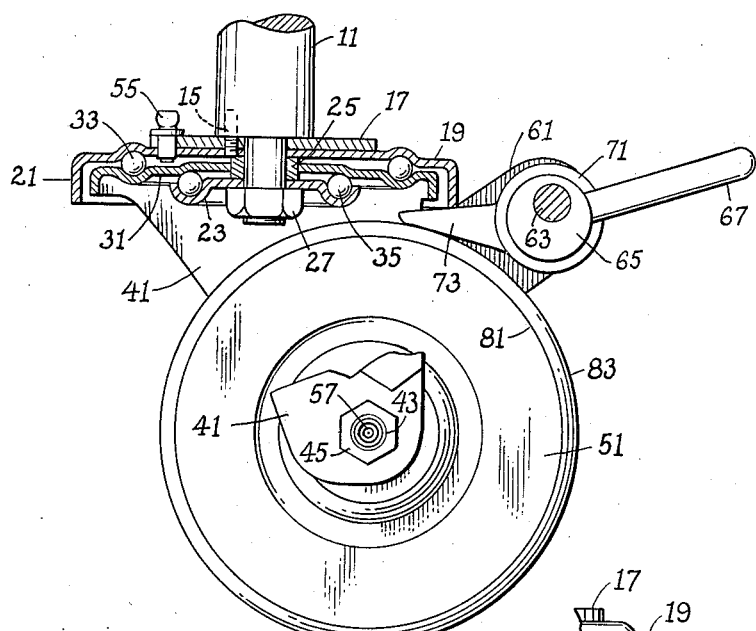
Figure 5:
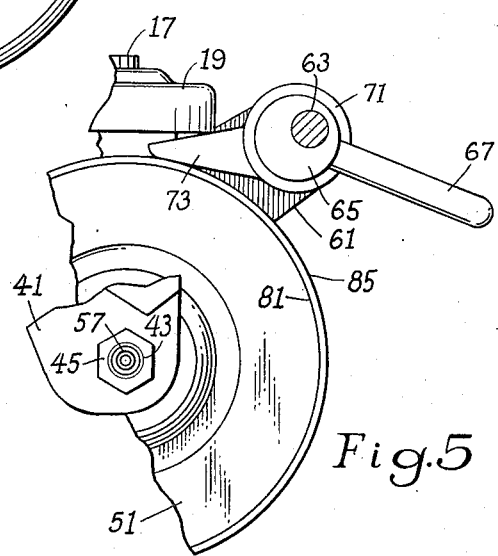

Fig. 4 is a side elevation similar to Fig. 2, with parts broken away and parts in vertical section approximately on the line 4—4 of Fig. 1, showing the locking mechanism in locked position engaging a new caster wheel of full initial diameter; and Fig. 5 is a view similar to a fragment of Fig. 4, showing the action of the parts when locking against a worn caster wheel of substantially smaller diameter.

The same reference numerals throughout the several views indicate the same parts.

Referring now to the drawings, the preferred form of construction comprises a shank 11 adapted to fit within a suitable socket on the industrial truck or other article mounted on the caster structure, and to be held immovably therein as by means of a cross pin inserted through the cross bore 13 of this shaft. Fixed to the lower end of the shank 11, and held against turning thereon as by means of a pin 15, are two plates 17 and 19, the latter having a depending marginal flange 21 of substantially circular annular outline. Another circular plate 23, of smaller diameter than the plate 21, is spaced below the latter by means of a spacing bushing 25, and is held tightly and immovably against the spacing bushing by a nut 27 screwed on the threaded lower end of the shank 11.

The caster plate 31 is interposed between the two stationary plates 19 and 23, and rotates on the bushing 25. The respective plates are embossed as shown to provide ball races or tracks, concentric with the axis of the shank 11, for receiving bearing balls 33 forming a ball bearing between the stationary plate 19 and the rotatable caster plate 31, and other bearing balls 35 forming a ball bearing between the rotatable caster plate 31 and the lower stationary plate 23.

The caster plate 31 is formed to provide downturned ears 41 which support between them the horizontally extending caster wheel shaft 43 held by nuts 45 and provided, between the ears 41, with a suitable bearing (preferably a ball bearing or roller bearing) for a caster wheel 51, the tread surface of which may be formed, for example, of tightly compressed canvas layers or plies bonded to each other by a bonding agent, or formed of rubber or a rubber composition, or any of the other known materials used for making casters for industrial trucks. As usual in casters, the axis of the wheel shaft 43 is offset to one side of the axis of the shank 11, so that when the direction of travel of the truck changes, the caster will swivel accordingly around the axis of the shank 11, this swiveling being accomplished by the plate 31 turning on the ball bearings 33 and 35.

A lubricating grease fitting 55 allows the insertion of lubricating grease in the swivel bearing 33, while another grease fitting 57 (Fig. 3) is for insertion of grease into the bearing on which the caster wheel 51 rotates on its axle 43.

The side ears 41 carry extensions 61 extending obliquely upwardly as seen in Fig. 2, which arms 61 are either formed integrally with the metal of the ears 41, or formed as separate metal pieces welded or riveted onto the flat portions of the outer surfaces of the ears 41. Near their upper ends, these arms 61 carry a short cross shaft 63 held stationarily by the arms, on which cross shaft is rotatably mounted an eccentric barrel 65 to which is stationarily secured an operating handle 67 preferably of U-shaped formation as best seen in Fig. 3.

Figure 3:
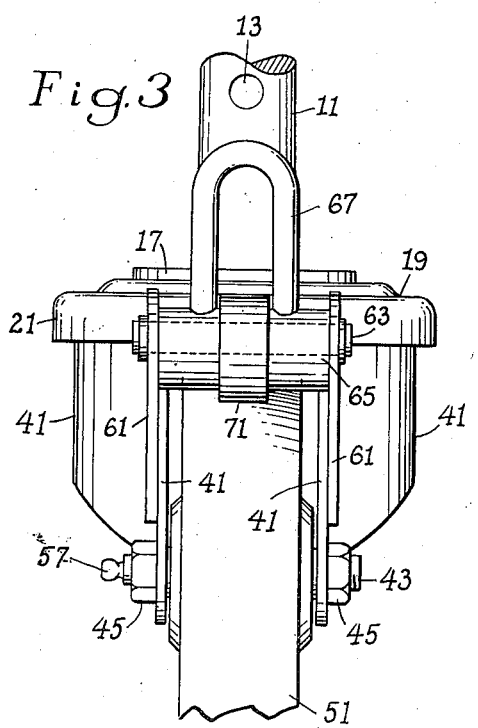
Fig. 3 is a side elevation of the caster viewed from the right hand side of Fig. 2, with parts broken away.

A locking wedge member has a narrow part 71 extending circumferentially around the eccentric barrel 65 in the space between the two legs of the handle 67, as best seen in Figs. 1 and 3. From this portion, constituting essentially an eccentric strap, the locking wedge member extends in a general direction toward the axis of the shank 11, and is considerably widened as seen at 73 in Fig. 1, this widened portion being of tapering or wedge-like formation adapted to fit tightly between and lock against the upper peripheral surface of the caster wheel 51 and the lower edge of the marginal flange 21 on the stationary plate 19, when the eccentric 65 is manipulated to shove the wedge portion 73 toward the axis of the shank 11. This wedge portion 73 normally rests loosely by gravity on the tread of the wheel 51, and thus may be described as a free floating member, when the caster is unlocked.

The handle 67 is placed in such position on the eccentric 65 that when the handle is in an upright position as shown for example in Fig. 2, the maximum eccentricity of the eccentric 65 extends in a direction radially outwardly from the shaft 63 on the side thereof away from the axis of the shank 11. As the top of the handle 67 is swung outwardly and downwardly (conveniently by pressure of a person's foot) or in a clockwise direction when viewed as in Fig. 2, to a position such as shown for example in Fig. 4, the eccentric 65 swings around the shaft 63 so as to shove the locking wedge 73 toward the axis of the shank 11 with considerable force, causing the wedge to press firmly downwardly like a brakeshoe on the periphery of the caster wheel 51, and at the same time causing it to react firmly upwardly against the stationary lower edge of the marginal flange 21 on the stationary plate 19. Thus the member 73 constitutes a duplex brake, preventing the caster wheel 51 from turning on its axis 43, and also preventing the caster wheel and caster plate 31 from turning horizontally relative to the stationary plate 19, 21. The caster is thus locked against all movement in every direction. Downward foot pressure applied to the handle 67, as for example by stepping on it, can produce any desired amount of locking force on the wedge or brakeshoe 73. Yet it is comparatively easy to unlock the caster again when desired, either by pulling upward on the handle 67 by the fingers, or preferably by giving it a slightly upward kick with the foot.

One of the valuable features of this construction is that the locking mechanism is capable of accommodating itself satisfactorily to a considerable variation in the diameter of the caster wheel 51, caused by wear. Thus when a caster wheel is new and of the intended original diameter, the parts will be firmly locked when the handle 67 is in approximately the position indicated in Fig. 4. When the wheel has worn down, through constant use, to a somewhat smaller diameter, as shown in Fig. 5, the caster may still be locked effectively and firmly, the handle 67 in this case turning somewhat further downwardly in order to accomplish the locking operation as the diameter of the caster wheel wears more and more. For the sake of comparison, the circle 81 in Figs. 4 and 5 is of the same diameter, and is shown for reference purposes. The wheel surface 83 in Fig. 4 is substantially farther away from the reference circle 81 than is the wheel surface 85 in Fig. 5, thus indicating a wearing down of the diameter of the wheel surface in Fig. 5 as compared with Fig. 4. Yet the locking mechanism will still operate satisfactorily, and in fact the range of the eccentric 65 is not yet completely used up, but it will be seen that even if the wheel diameter wears down still further, the mechanism can still lock the caster satisfactorily by turning the handle 67 still further downwardly in a clockwise direction, so that the throw of the eccentric moves the wedge 73 further inwardly toward the axis of the shank 11, and at the same time tends to raise the outer end of the wedge to cause it to bear upwardly like a lever against the lower edge of the flange 21, thus simultaneously causing downward movement of the inner end of the wedge, toward the worn face of the caster wheel 51.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The combination of a stationary mounting plate having a depending marginal flange, of a caster trunnion member rotatably mounted on said mounting plate, a caster wheel rotatably mounted on said trunnion member with the upper part of its periphery spaced a short distance from the end of said depending flange, an eccentric also rotatably mounted on said trunnion member for rotation about an axis of rotation approximately radially outwardly of said depending flange and substantially parallel to the axis of rotation of said wheel, and a substantially triangular locking wedge having its apex interposed between the periphery of said wheel and said depending flange on said mounting plate, said locking wedge having its wide end connected to a portion encircling said eccentric to be moved thereby in a substantially horizontal direction when the eccentric is turned, the parts being so arranged that when said eccentric is turned from one position toward another position, said locking wedge is thrust tightly between said flange and the periphery of said wheel to lock said wheel against turning on its own axis and also to lock said trunnion member against turning relative to said stationary mounting plate.

2. A caster lock comprising a mounting member, a caster plate secured to said mounting member for rotation relative thereto about an approximately vertical axis, a pair of depending ears on said caster plate in laterally spaced relation to each other, a caster wheel mounted for rotation on an approximately horizontal axle extending between said ears and laterally offset from said vertical axis, said mounting member having a portion overlying and spaced upwardly a short distance from the upper part of the periphery of said wheel, an elongated substantially triangular locking wedge member having its apex interposed between the upper part of the periphery of said wheel and the overlying portion of said mounting member, and means connected to the wide end of said wedge member for moving said wedge member in a direction substantially tangent to the periphery of said wheel to move said apex tightly into and to withdraw said apex partially from the space between said wheel and said overlying portion, said wedge member when moved tightly into said space serving both to lock said wheel frictionally against turning on its axle and to lock said caster plate against turning relative to said mounting member.

3. A construction as defined in claim 2, in which said means includes an eccentric operating member.

4. A construction as defined in claim 2, in which said means includes an eccentric operating member having an approximately U-shaped operating handle extending approximately radially with respect to the axis of rotation of said eccentric member, and in which said wedge member has an eccentric strap portion surrounding said eccentric member in the space between two arms of said operating handle.

5. Locking means for a caster having a wheel rotatable about a horizontal axis and also revoluble about an approximately vertical axis with respect to a stationary member spaced a short distance above the upper portion of the periphery of the wheel, said locking means comprising an elongated substantially wedge-shaped friction locking member having its apex movable between the upper portion of the periphery of said wheel and the overlying stationary member, and rotary cam means connected to the wide end of said locking member for moving said locking member in a direction substantially along its length and tangent to the periphery of said wheel to and from an effective locking position in which it presses downwardly against the periphery of said wheel and upwardly against said overlying stationary member in frictional locking engagement with both of them.

6. A caster including a shank, a circular mounting plate fixed to said shank and having a depending marginal flange, a caster trunnion member rotatably mounted on said mounting plate, a caster wheel rotatably mounted on said trunnion member, a pair of spaced arms secured to said trunnion member and extending upwardly and radially outwardly of said depending flange, an eccentric rotatably mounted between the upper portion of said arms for rotation about an axis substantially parallel to the axis of rotation of said wheel, a substantially triangular locking wedge having its apex interposed between the periphery of said wheel and said depending flange on said mounting plate, said locking wedge having a portion fixed to its wide end and encircling said eccentric for moving said locking wedge in a substantially horizontal direction between an unlocked and a locked position in response to turning of said eccentric, said locking wedge being thrust tightly between said depending flange and the periphery of said wheel when in said locking position to lock said wheel against turning on its own axis and also to lock said trunnion member against turning relative to said stationary mounting plate.

7. A construction as defined in claim 6, wherein said apex of said locking wedge in said unlocked position rests by gravity on the periphery of said wheel.

References Cited in the file of this patent

UNITED STATES PATENTS

| | | |
|---|---|---|
| 155,548 | Shultz | Sept. 29, 1874 |
| 1,428,932 | Bayer | Sept. 12, 1922 |
| 1,496,548 | Knight | June 3, 1924 |
| 1,731,312 | Matheson | Oct. 15, 1929 |
| 2,262,433 | Uecker et al. | Nov. 11, 1941 |
| 2,345,442 | Winter | Mar. 28, 1944 |
| 2,707,794 | Kramcsak | May 10, 1955 |